June 13, 1961 L. D. MASSER 2,988,352
SPRING STRUCTURE FOR AUTOMOTIVE VEHICLES AND THE LIKE
Filed June 12, 1959 2 Sheets-Sheet 2

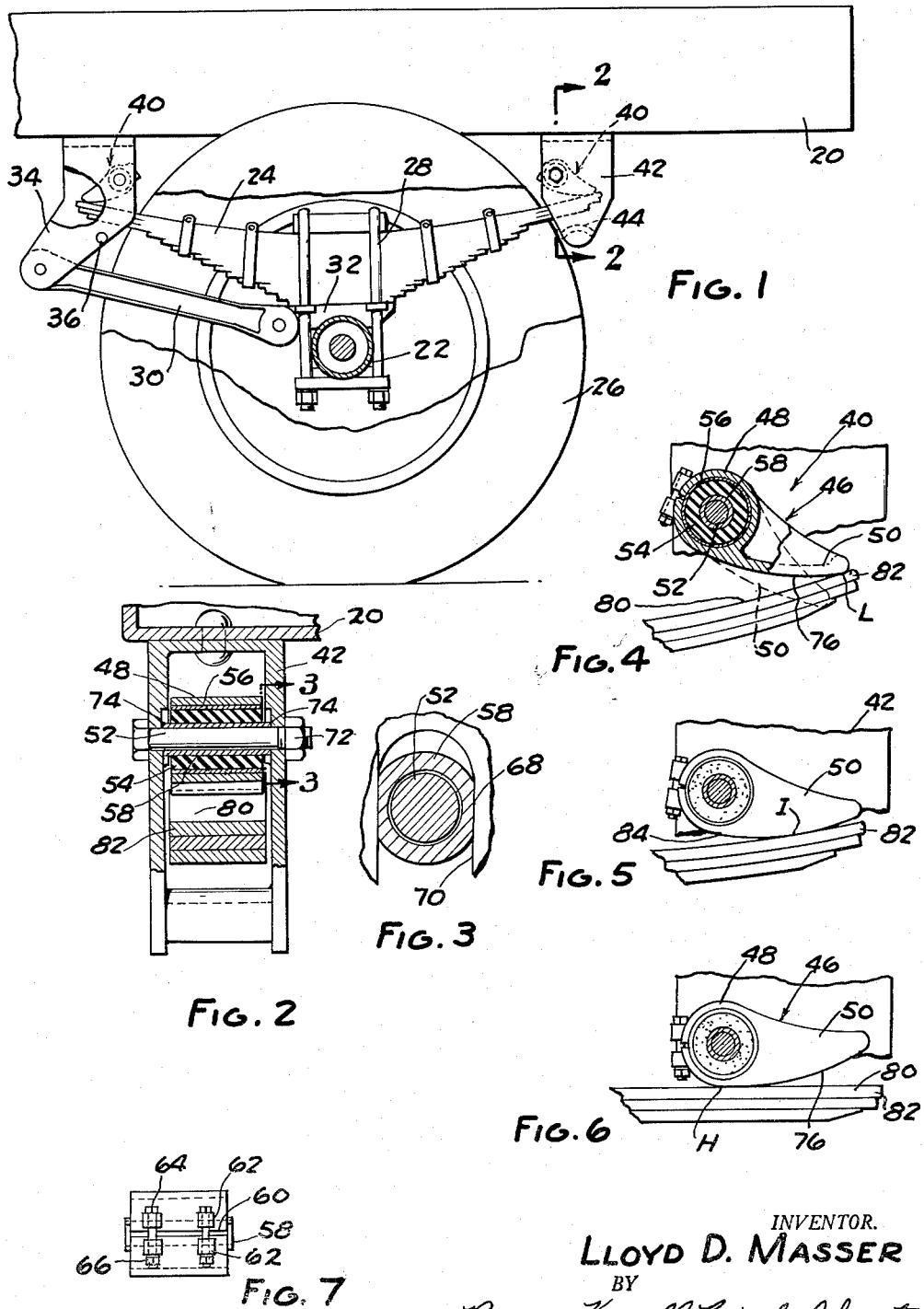

INVENTOR.
LLOYD D. MASSER
BY
Barnes, Kisselle, Raisch & Choate
ATTORNEYS

United States Patent Office 2,988,352
Patented June 13, 1961

2,988,352
SPRING STRUCTURE FOR AUTOMOTIVE VEHICLES AND THE LIKE
Lloyd D. Masser, Muskegon, Mich., assignor to Neway Equipment Company, Muskegon, Mich., a corporation of Michigan
Filed June 12, 1959, Ser. No. 819,867
4 Claims. (Cl. 267—25)

The spring structure of this invention is especially useful in providing an auxiliary spring in a heavy duty truck utilizing spring stacks or rigid walking beams in their suspensions. When such a vehicle is unloaded or lightly loaded, the relatively massive spring stacks in its suspension flex very little and tend to act as solid beams rather than as springs. The truck thus rides very roughly and is very fatiguing on the operator.

An object of this invention is to provide a simple, inexpensive, improved spring structure which provides adequate spring action in a lightly loaded or unloaded vehicle and which is also capable of transmitting heavy loads from the vehicle frame to the main suspension.

The invention generally contemplates a number of rockers on the vehicle frame and having arms which rockably engage the upper surfaces of the spring stacks. The rockers are mounted through rubber torsion springs which urge the rocker arms against the spring stacks and support the unloaded or lightly loaded vehicle frame. Spring action is obtained by rocking movement of the rockers. Under heavy loads, the rockers seat solidly on the spring stacks, the latter then providing all of the spring action.

In the drawings:

FIG. 1 is a fragmentary generally elevational view of a truck suspension embodying the present invention.

FIG. 2 is an enlarged sectional view on line 2—2 of FIG. 1.

FIG. 3 is an enlarged sectional view on line 3—3 of FIG. 2.

FIG. 4 is a generally elevational view of the auxiliary spring structure, parts being broken away and shown in section.

FIG. 5 is a view similar to FIG. 4 but showing the auxiliary spring under a different load condition.

FIG. 6 is a view similar to FIG. 5 but showing the auxiliary spring in a heavily loaded condition.

FIG. 7 is an elevational view of one end of the spring structure.

Figure 8:
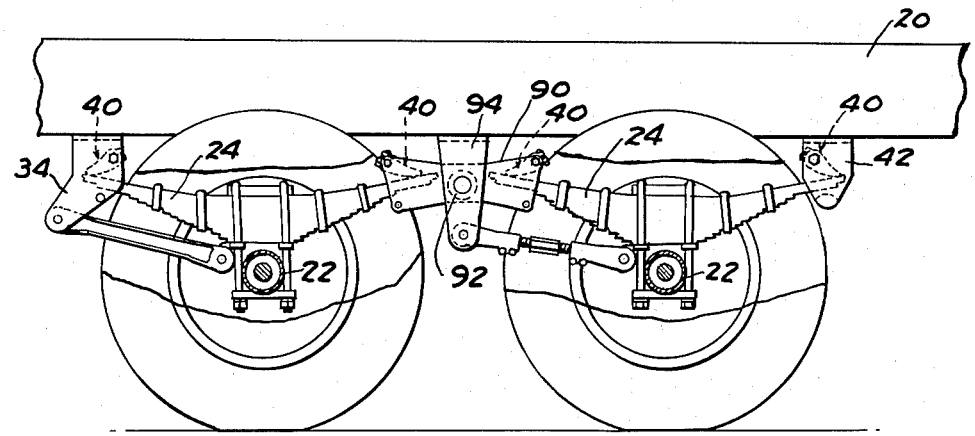
FIG. 8 is a fragmentary elevational view illustrating a different type of truck suspension embodying the present invention.

Shown in FIG. 1 is a truck frame 20 with an axle 22 supported therefrom through a spring stack 24. Axle 22 carries ground engaging wheels 26 and its outer housing is secured to the spring stack by U-bolts 28. Radius rods 30 are pivoted at one end to a member 32 underlying the spring stack and are pivoted at their other ends to a bracket 34 fixed on frame 20. Bracket 34 carries a rebound stop pin 36 and supports an auxiliary spring assembly 40 adjacent one end of the spring stack. Another bracket 42 fixed on frame 20 carries a rebound shoe 44 and supports another auxiliary spring assembly 40 adjacent the other end of the spring stack.

The auxiliary spring structure 40 includes a rocker 46 having a sleeve portion 48 and an arm 50 extending laterally from the sleeve. A pivot pin 52 in the form of a bolt passes through the sleeve and a torsion spring is interposed between the pin 52 and sleeve 48. This spring includes a tubular body 54 of resiliently distortable material such as a natural or synthetic rubber or elastomeric material bonded to a surrounding shell 56 and to an interior shell 58 which engages around pin 52. Sleeve 48 has a longitudinal split 60 and carries two pairs of apertured lugs 62 through which bolts 64 extend. Bolts 64 are threaded for engagement with nuts 66 which can be turned for clamping sleeve 48 around the contained torsion spring 54 or for releasing the sleeve to permit angular adjustment thereof relative to the spring for a purpose to be described.

Shell 58 has flat surfaces 68 which engage against complementary surfaces 70 on bracket 42 to secure the shell against rotation relative to the bracket. A nut 72 threaded onto pin 52 securely anchors the spring structure to bracket 42. Inner shell 58 is shown as projecting into engagement with internal surface portions of bracket 42 as at 74 (FIG. 2) to secure the spring assembly against lateral movement while permitting rocking movement of sleeve 48 and arm 50.

Arm 50 has a surface 76 which is contoured so that it will rockably engage against the upper surface 80 of the top leaf 82 in the spring stack. For this purpose, surface 76 is shown as having a rounded contour. This contour blends with the outer surface of sleeve 48 as generally indicated at 84 (FIG. 5). The radius of curvature of surface 76 is greater than that of the outer surface of the sleeve.

In use it may be assumed that spring assemblies 40 have been mounted on brackets 34 and 42 and are positioned so that rocker arms 50 may be engaged against upper spring leaves 82. Before rocker arms 50 are engaged against spring leaves 82 they will extend downwardly to a position such as that indicated in dotted lines in FIG. 4. This is the pre-load or unstressed position of spring assemblies 40. When the weight of the frame is imposed on the spring assemblies, rocker arms 50 rock relative to pins 52 thereby placing the rubber bodies 54 in torsion. The rubber bodies urge the rocker arms into engagement with the spring stack and thereby yieldably support the load of frame 20. When the truck is unloaded, rockers 46 will be in the position illustrated in FIG. 4. At this time, rocker arm 50 engages upper spring leaf 82 at a location L.

When the load of frame 20 is increased, rocker 46 rocks in a counter-clockwise direction as FIGS. 4–6 are viewed, thereby increasing the stress in rubber body 54 and increasing the spring rate thereof. Moreover, because of the curvature of rocker arm surface 76, the region of contact between arm 50 and spring leaf 82 moves inwardly or to the left as FIG. 5 is viewed to a location I. Location I is closer to the rocking axis of rocker 46 than location L and the lever arm tending to stress rubber body 54 is decreased. Therefore, the rate of spring assembly 40 is increased.

If the load of frame 20 is further increased, rocker 46 rocks further in a counter-clockwise direction thereby further stressing rubber body 54 and further shortening the effective lever arm of the spring assembly and increasing the rate of the spring assembly 40. Under fully loaded conditions, rocker 46 will be in the position illustrated in FIG. 6. In this position the location of contact between the rocker and spring leaf 82 is directly under the rocker axis as at H. At this point, an exterior portion of sleeve 48 in effect engages spring leaf 82. In this position spring stack 24 provides substantially all of the spring action for the vehicle.

When the frame load is again lightened, rocker 46 is rocked in a clockwise direction as FIGS. 4–6 are viewed by the stress in rubber body 54. The region of contact of rocker arm 50 moves outwardly from the heavily loaded position H to the intermediate load position I and ultimately to the lightly loaded position L. The spring rate of spring assembly 40 thereby diminishes because of decreased stress in body 54 and lengthening of the lever arm provided by arm 50.

Pivot pin 52 is fixed on bracket 42 and its motion is generally rectilinear relative to spring stack 82. Consequently there will be some sliding action of arm surface 76 on spring surface 80 when frame 20 moves vertically relative to the spring stack.

The spring rate of the auxiliary spring assembly 40 is less than that of spring stack 24 but is sufficient to provide adquate spring action for frame 20 under lightly loaded conditions or unloaded conditions. The rate of spring assembly 40 may be adjusted by raising frame 20 or dropping the suspension so that rocker 46 shifts to the dotted line position of FIG. 4 wherein rubber body 54 is unstressed. Nuts 66 are then loosened to relieve the clamping action of split sleeve 48 around the inner spring structure. Rocker 46 may then be turned relative to the spring structure and nuts 66 retightened. The frame is then lowered or the suspension elevated to reestablish load-bearing relation between the frame and suspension.

A worn or damaged component of spring assembly 40 may be easily replaced merely by relieving frame load on the suspension in the manner described, removing nut 72 and pin 52 and loosening nuts 66. The damaged part or parts may be replaced and the parts reassembled. Similarly, an entirely new spring assembly may be easily installed.

In the event that auxiliary spring 40 should fail during operation of the vehicle, pin 52 or a part of bracket 42 will merely drop into engagement with the top of spring stack and the vehicle may continue to operate. The assembly is light-weight, simple and inexpensive. No lubrication of the assembly is required. The assembly is very sturdy, requires little or no maintenance and is subject to very little breakage.

Shown in FIG. 8 is another form of suspension in which spring assemblies 40 according to this invention can be used. This suspension includes two axles 22 mounted in tandem through spring stacks 24 and an interposed equalizer 90 pivoted as at 92 on a bracket 94 depending from frame 20. Equalizer 90 carries a pair of spring assemblies 40 according to this invention which engage the adjacent ends of the spring stacks as shown. The remote ends of the spring stacks are also engaged by spring assemblies 40 supported by brackets 34 and 42 in the manner described above.

Figure 9:
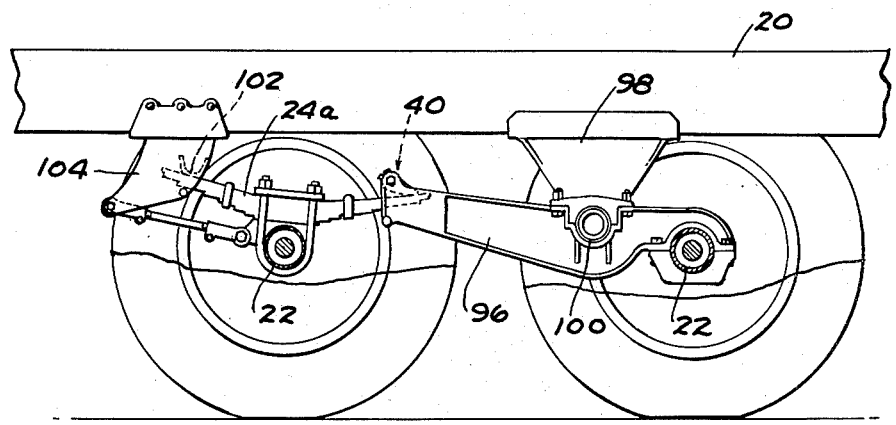
FIG. 9 is a fragmentary elevational view illustrating a third type of truck suspension embodying the present invention.

FIG. 9 shows a third form of suspension in which spring assembly 40 may be used. In this suspension, axles 22 are suspended in tandem from frame 20, one through a spring stack 24a and the other through a walking beam 96 pivoted at an intermediate location on a bracket 98 depending from frame 20 as at 100. Spring assembly 40 is carried by an end portion of walking beam 96 as shown and engages against an upper end portion of spring stack 24a. The other end of the spring stack is engaged by a shoe 102 fixed on a bracket 104 secured to the vehicle frame.

Operation of the spring assemblies 40 in the suspensions shown in FIG. 8 and 9 is similar to operation of spring assemblies 40 the FIG. 1 type of suspension.

I claim:

1. In a vehicle having a frame member, a member to which load is to be transmitted, and a spring assembly interposed between said members for yieldably supporting relative load on said members, said spring assembly utilizing a spring stressed by movement of a rocker swingably mounted on one member and having a surface contoured to engage the other member in a shifting region of contact responsive to load induced rocking of said rocker, improved spring assembly construction comprising, a body of resiliently distortable material such as rubber, means on said one member and means on said rocker co-operating, when said surface is engaged against said other member, to stress said body of material in torsion so that it yieldably resists load induced rocking of said rocker and thereby yieldably supports relative load on said members, said rocker and other member having means which, in the position of said rocker assumed under heavy loads, bottom with respect to each other so that under heavy loads said body of material forms a resilient cushion through which load is transmitted in a direction generally radial of the rocking axis of said rocker.

2. In a vehicle having a frame member, a member to which load is to be transmitted, and a spring assembly interposed between said members for yieldably supporting relative load on said members, said spring assembly utilizing a spring stressed by movement of a rocker swingably mounted on one member and having a surface contoured to engage the other member in a shifting region of contact responsive to load induced rocking of said rocker, improved spring assembly construction comprising, a body of resiliently distortable material such as rubber, means on said one member and means on said rocker co-operating, when said surface is engaged against said other member, to stress said body of material in torsion so that it yieldably resists load induced rocking of said rocker and thereby yieldably supports relative load on said members, said surface of said rocker having a portion which in the position of said rocker assumed under heavy loads bears against said other member in a direction generally radial of the rocking axis of said rocker, so that under heavy loads said body of material forms a resilient cushion through which load is transmitted in said radial direction.

3. In a vehicle having a frame member, a member to which load is to be transmitted, and a spring assembly interposed between said members for yieldably supporting relative load on said members, said spring assembly utilizing a spring stressed by movement of a rocker mounted on one member through a pivot and having a surface contoured to engage the other member in a shifting region of contact responsive to load induced rocking of said member, improved spring assembly construction comprising, a body of resiliently distortable material such as rubber disposed in torsionally stressed condition between said pivot and rocker so that it yieldably resists load induced rocking of said rocker and thereby yieldably supports relative load on said members, said surface of said rocker having a portion which in the position of said rocker assumed under heavy loads bears against said other member in a direction which is generally radial of said pivot, so that under heavy loads said body of material forms a resilient cushion through which load is transmitted in said radial direction from said pivot to said rocker and said other member.

4. The combination defined in claim 3 wherein said portion of said rocker surface has a relatively small radius of curvature generally circumferential to the axis of said pivot, said surface having another portion blending with and extending away from said one portion, said other portion having a radius of curvature greater than said one portion.

References Cited in the file of this patent

UNITED STATES PATENTS

| | | |
|---|---|---|
| 1,339,779 | Mohler | May 11, 1920 |
| 2,740,622 | Hickman | Apr. 3, 1956 |